United States Patent [19]
Lloyd et al.

[11] Patent Number: 5,177,054
[45] Date of Patent: Jan. 5, 1993

[54] FLUX TRAPPED SUPERCONDUCTOR MOTOR AND METHOD THEREFOR

[75] Inventors: Jerry D. Lloyd; Alan D. Crapo, both of St. Louis, Mo.

[73] Assignee: Emerson Electric Co., St. Louis, Mo.

[21] Appl. No.: 682,447

[22] Filed: Apr. 8, 1991

[51] Int. Cl.$^5$ .............. H02K 1/22; H02K 9/00; H02K 21/12; H01L 39/12
[52] U.S. Cl. .................................. 505/1; 310/10; 310/268; 310/54; 310/156
[58] Field of Search ............. 310/10, 52, 54, 156, 310/261, 268; 29/598, 599; 505/1, 700

[56] References Cited

U.S. PATENT DOCUMENTS

| | | | |
|---|---|---|---|
| 490,280 | 1/1893 | Hansen | 310/268 |
| 3,405,290 | 10/1968 | Halas | 310/10 |
| 3,441,755 | 4/1969 | Grunwald et al. | 310/10 |
| 3,564,307 | 2/1971 | Kawabe et al. | 310/10 |
| 3,584,246 | 6/1971 | Halas | 310/10 |
| 3,609,418 | 9/1971 | Halas | 310/10 |
| 3,673,444 | 6/1972 | Kawabe et al. | 310/10 |
| 3,762,042 | 10/1973 | Abe et al. | 310/268 |
| 4,808,864 | 2/1989 | Brunet et al. | 310/52 |
| 4,870,838 | 10/1989 | Zeamer | 62/51.1 |
| 4,987,674 | 1/1991 | Denk | 29/598 |

FOREIGN PATENT DOCUMENTS 0117648  5/1989  Japan .................... 505/700

Primary Examiner—Steven L. Stephan
Assistant Examiner—Clayton E. LaBalle
Attorney, Agent, or Firm—Polster, Lieder, Woodruff & Lucchesi

[57] ABSTRACT

A motor (10) comprises a stator (14) having an associated stator winding (24) formed of a conventional material such as copper, or of a superconductive material. A rotor (12) for the motor is also formed of a superconductive material. The rotor is placed in a cryostat (16) and cooled from a first temperature which is above a critical level to a second temperature which is below the level. The stator is placed in a second and separate cryostat (18) and the stator winding is energized while the rotor temperature is being lowered to below the critical level. Once the superconductive material of the rotor has been cooled to a level below the critical level, the stator winding is de-energized. Currents are now induced in the superconductive material of the rotor to trap or maintain magnetic flux therein. Thereafter, the rotor acts as a permanent magnet so long as it is maintained below the critical temperature.

13 Claims, 4 Drawing Sheets

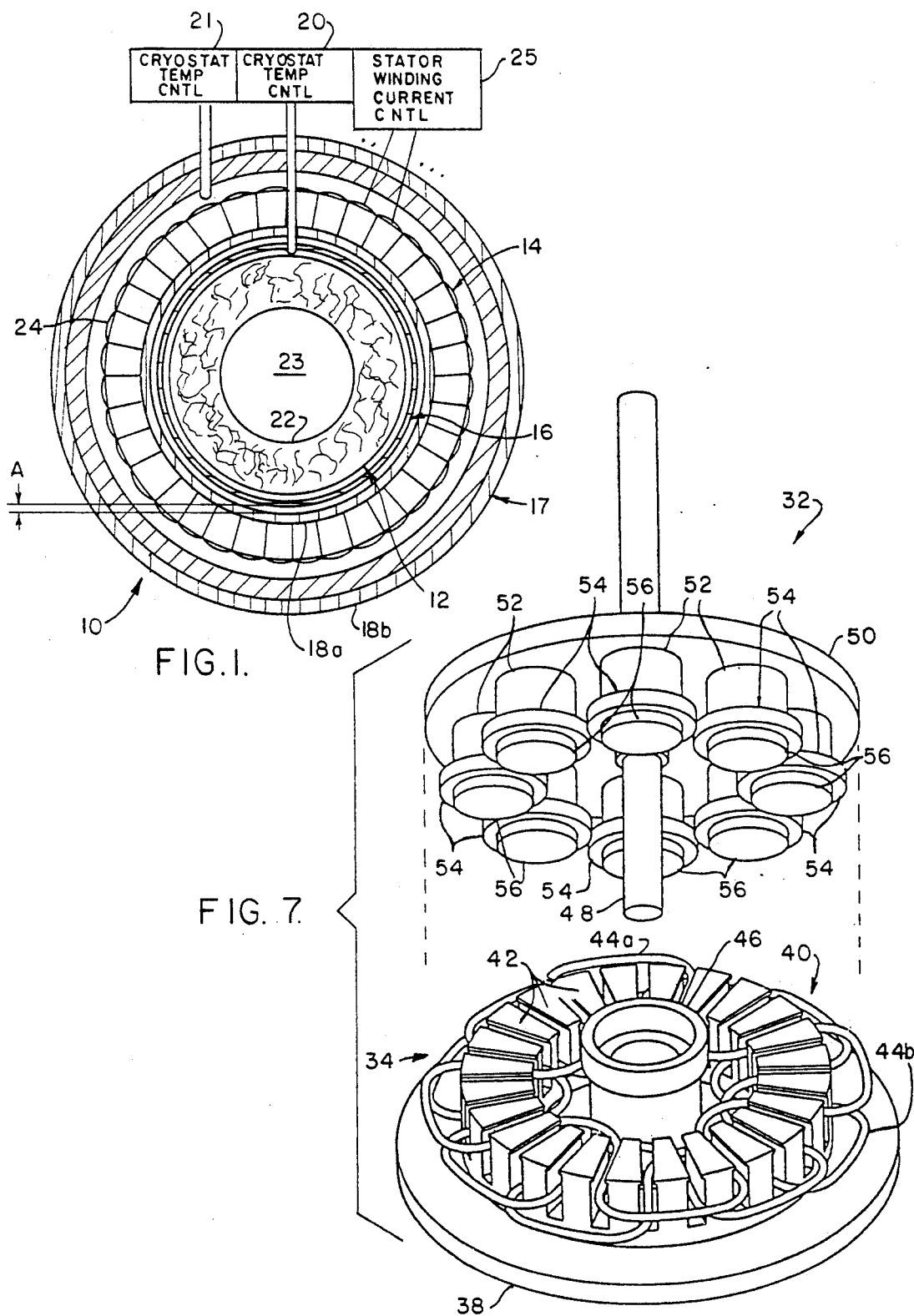

FLUX TRAPPED SUPERCONDUCTOR MOTOR AND METHOD THEREFOR

BACKGROUND OF THE INVENTION

This invention relates to brushless D.C. motors fabricated using superconductive materials and, more particularly, to such a motor in which the rotor temperature is controllable to a temperature below a critical temperature, while a stator winding is energized thereby to trap flux within the rotor portion of the motor so the rotor acts as a permanent magnet.

Trapping flux in a superconductor coil or in a bulk material can produce a relatively high energy "permanent magnet". As the flux trapping capability of high temperature superconducting (HTSC) materials improves, and difficulties in fabricating high current conductors diminish, there will be an increased number of motor applications that will benefit from such materials. The HTSC materials referred to include the families of ceramic based materials currently being developed. The high temperature referred to is a temperature above that of liquid helium (He) which is 4.2 degrees Kelvin (K). One advantage with these new type motors is their substantially lower weight and smaller size for a given power rating as compared to conventional motors. Theoretically, magnets made of HTSC materials will have five-to-ten times higher energy than magnets currently in use, for example, those made of rare earth. HTSC coils or the bulk material used in the new motors will need to be "charged" or magnetized just as conventional permanent magnets must be. Also, the rotor can be magnetized to one level for one application, and to a different level for the next.

SUMMARY OF THE INVENTION

Among the several objects of the present invention may be noted the provision of a motor comprised of superconductive material including superconducting coils; the provision of such a motor which is a brushless D.C. motor; the provision of such a motor in which lines of flux are trapped in the rotor portion thereof so the rotor acts as a permanent magnet; the provision of such a motor in which the rotor material is magnetizable to different levels of magnetization depending upon the particular application for the motor; and, the provision of such a motor in the temperature of the stator and the rotor are separately controllable to facilitate the trapping of flux in the rotor.

In accordance with the invention, generally stated, a motor comprises a stator having an associated stator winding. This winding may be of a conventional conductor material such as copper, or it may be of a superconductive material. A rotor for the motor is also formed of a superconductive material. The rotor is placed in a cryostat and cooled from a first temperature which is above a critical level to a second temperature which is below the level. The stator is placed in a second and separate cryostat and the stator winding is energized while the the rotor temperature is being lowered to below the critical level. Once the superconductive material of the rotor has been cooled to a temperature level below the critical level, the stator winding is de-energized. Currents are now induced in the rotor to trap or maintain magnetic flux therein. Thereafter, the rotor acts as a permanent magnet so long as the rotor temperature is maintained below the critical level. A method of producing the motor is also disclosed. Other objects and features will be in part apparent and in part pointed out hereinafter.

BRIEF DESCRIPTION OF THE DRAWINGS

FIG. 1 is a representation of a radial gap superconductor motor of the present invention illustrating the method in which lines of flux are trapped within a rotor assembly of the motor;

FIG. 7 is an exploded view of the motor of FIG. 6;

Corresponding reference characters indicate corresponding parts throughout the drawings.

DESCRIPTION OF PREFERRED EMBODIMENTS

Figure 5:
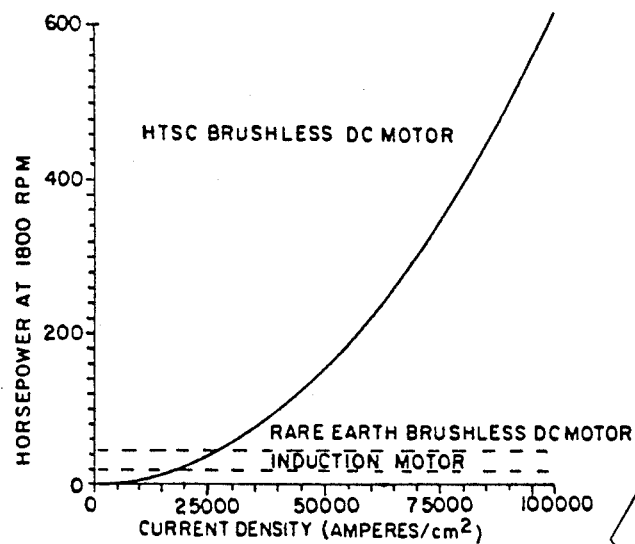
FIG. 5 is a graph illustrating horsepower versus current density in the motor's stator windings and in the rotor's superconductor material.

Referring to the drawings, a trapped flux superconductor brushless D.C. motor of the present invention is indicated generally 10. Motor 10 has a rotor assembly indicated generally 12, and a stator assembly indicated generally 14. As seen in FIG. 1, the rotor assembly is installed and maintained in a first and single walled cryostat 16; while, the stator assembly is installed and maintained in a separate and dual walled cryostat 17. Motor 10 is a radial gap motor in which the rotor and stator assemblies are concentrically oriented with the stator assembly surrounding the rotor assembly. For this motor configuration, the single wall cryostat 12 in which the rotor assembly is mounted is sized to fit within the dual walled cryostat 17. Cryostat 17 has an inner wall 18a inside of which cryostat 16 fits, and an outer wall 18b. Each cryostat is separately controlled by respective control means, 20 and 21 respectively. With the rotor and stator assemblies are maintained in separate cryostats, an air gap A is maintained between the two concentric assemblies. It will be understood that the motor 10 configuration shown in FIG. 1 is illustrative only and not to any scale; and that in practicing the invention other suitable configurations are possible.

It is a feature of the present invention that the rotor is comprised of a high temperature ceramic superconductive (HTSC) material which may, for example, comprise a cylinder or disk of HTSC material 22 installed on a rotor shaft 23. The stator may be of any appropriate material. In addition, the stator windings 24 may be either of a conventional electrical conductor material such as copper (for motor applications where a lower stator current is required), or also of a HTSC superconductor material. It is a feature of high temperature ceramic superconducting materials that they have the ability to trap magnetic fields. Because of this feature, it is possible to produce a brushless D.C. motor 10 which has a substantially lower weight and size for a given horsepower rating than conventional motors. In addition, because the superconductor material can trap flux in the rotor, the rotor can become, in effect, a permanent magnet. However, the magnetization level of magnetization the rotor can be much higher than for conventional magnets. Theoretically, the level of magnetization could be five-to-ten times that of conventional rare earth magnets. Further, the superconductor can be magnetized at different times to different levels of magnetization depending upon the motor application.

The superconductive material of rotor assembly 12 needs to be "charged" or magnetized, just as with conventional permanent magnets. That is, a magnetic field is applied to the rotor while its temperature is above a critical temperature Tc. The rotor temperature is then lowered below this critical level while the magnetic field is still being applied. When the field excitation is subsequently removed, currents will circulate through the superconductor material to maintain the field and keep it from decaying.

Figure 10:
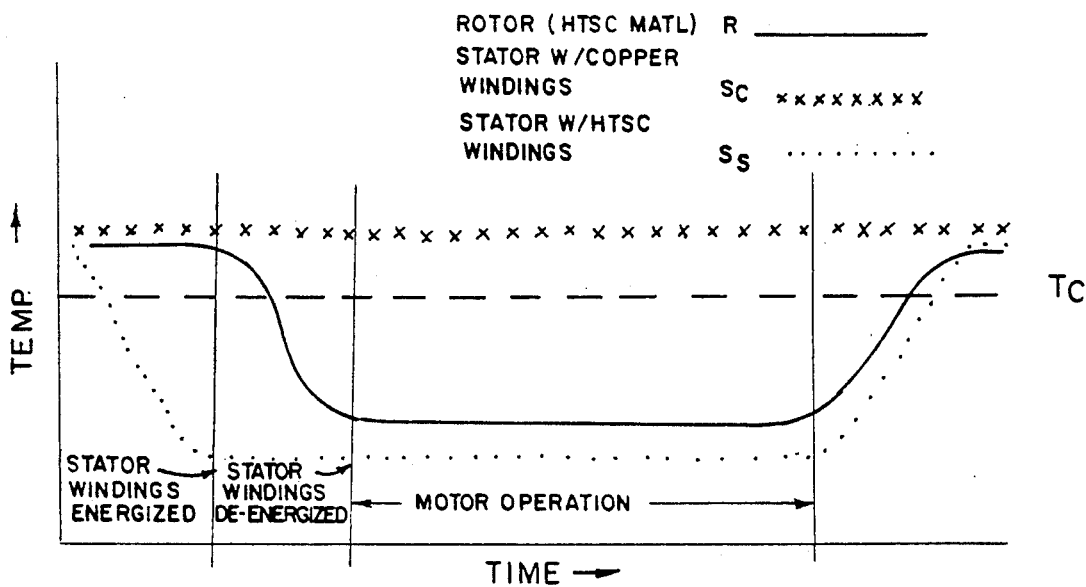

Referring to FIGS. 1 and 10, the rotor and stator assemblies are maintained in the respective separate cryostats 16 and 17. Initially, both assemblies are maintained at approximately the same temperature, which temperature is above a critical temperature Tc. If the stator windings are of a conventional electrical conductor material, the stator assembly temperature can be kept at this level. If, however, the stator windings are of a HTSC material, the stator assembly is cooled to below the critical temperature as shown in FIG. 10. Next, a current control 25 causes a high amperage D.C. current to flow through the stator windings 24. This flow of current will induce magnetic flux into the rotor assembly. Now, while the stator temperature is maintained at the appropriate level by cryostat control 21, cryostat control 20 acts to lower the rotor assembly temperature to below the critical temperature. Once the superconductive rotor material is cooled to a level below the critical temperature, the stator winding is de-energized. Currents are now induced in the rotor superconductive material to maintain or trap magnetic flux in the rotor. As further indicated in FIG. 10, so long as motor 10 is to operate, the rotor assembly temperature is kept below the critical temperature and the rotor acts as a permanent magnet with a high level of magnetization. Whenever motor operation terminates, the cryostat temperature control for the rotor (and stator, if applicable) allows the temperatures to rise above the critical temperature.

Figure 2:
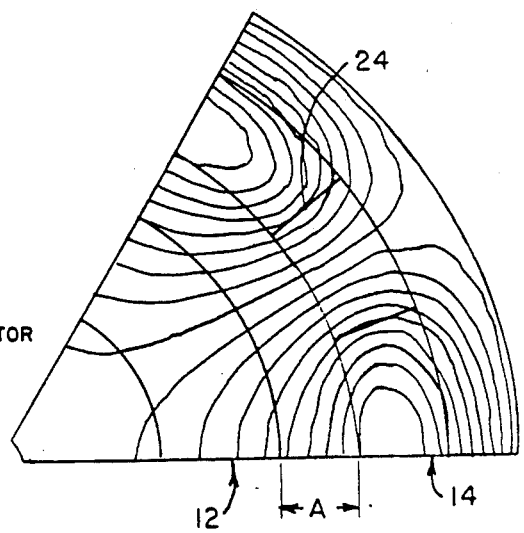
FIG. 2 is a flux diagram illustrating the flux density produced on a portion of the rotor during charging.
Figure 3:
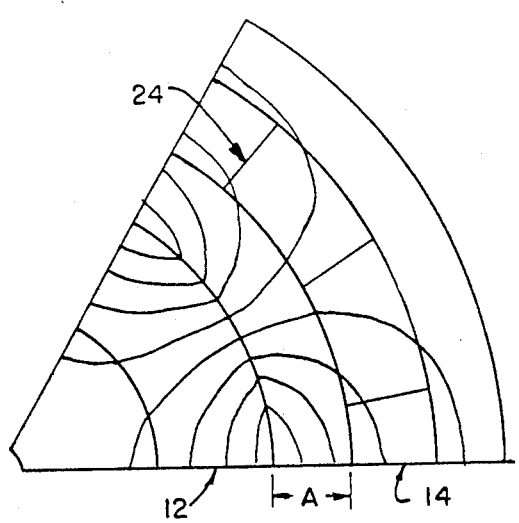
FIG. 3 is a flux diagram similar to FIG. 2 illustrating the flux trapped in the rotor after charging.
Figure 4:
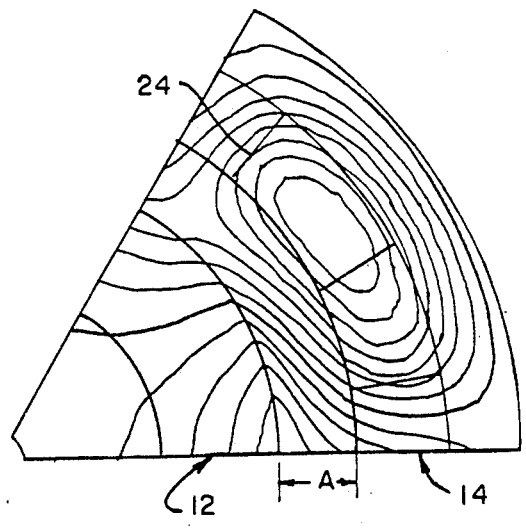
FIG. 4 is a flux diagram similar to FIG. 2 illustrating the combined rotor flux and stator flux in a peak torque position of the motor.

FIGS. 2-4 illustrate the above described phenomenon for a six-pole motor. The Figs. illustrate one-sixth of the motor rotor and stator assemblies. In FIG. 2, stator 14 is supplying flux to rotor 12, while the rotor is cooled to below the critical temperature. The coil space of stator windings 24 is, for example, twenty percent (20%) comprised of an HTSC material. If the winding is, for example, operating at a current density of 100,000 amperes/cm$^2$ in a 2.0 Tesla field, a rotor surface flux density is produced having a peak field of 1.0 Tesla. In FIG. 3, the current flow through the stator windings has ceased, but the peak field value of 1.0 Tesla (or a substantial fraction of the original 1.0 Tesla) is still maintained on the rotor surface. In FIG. 4, the current flow through the stator windings of 100,000 amperes/cm$^2$ produces a peak flux density in the coil of 2.0 Tesla.

For these conditions, the peak flux density in air gap A is, for example, 2.4 Tesla. For a superconductor motor 10, the torque produced is 2439 newton-meters. If the motor were operated at, for example, 1800 rpm, it could theoretically produce 616 hp. As a practical matter, design limitations would probably limit the actual motor hp output to a maximum of approximately 100 hp. It will be understood that the torque of motor 10 varies. By way of comparison, a standard induction motor of comparable size and operating in a fan cooled enclosure produces approximately 15 hp when operating at 1775 rpm. Such a motor has a service factor of 1.25, and a maximum continuous hp rating of 18.75 hp. By way of further comparison, a brushless rare earth permanent magnet motor using samarium cobalt or neodymium-iron-boron magnets in a similar size package can produce 180 newton-meters of torque at 1800 rpm. Such a motor will produce approximately 45 hp. Referring to FIG. 5, a graph of horsepower versus density is presented for motor 10, a conventional induction motor, and a rare earth permanent magnet brushless D.C. motor. As is seen therein, at low current densities, the power output of motor 10 is low. However, as current density increases, the horsepower output of the motor increases rapidly.

Figure 6:
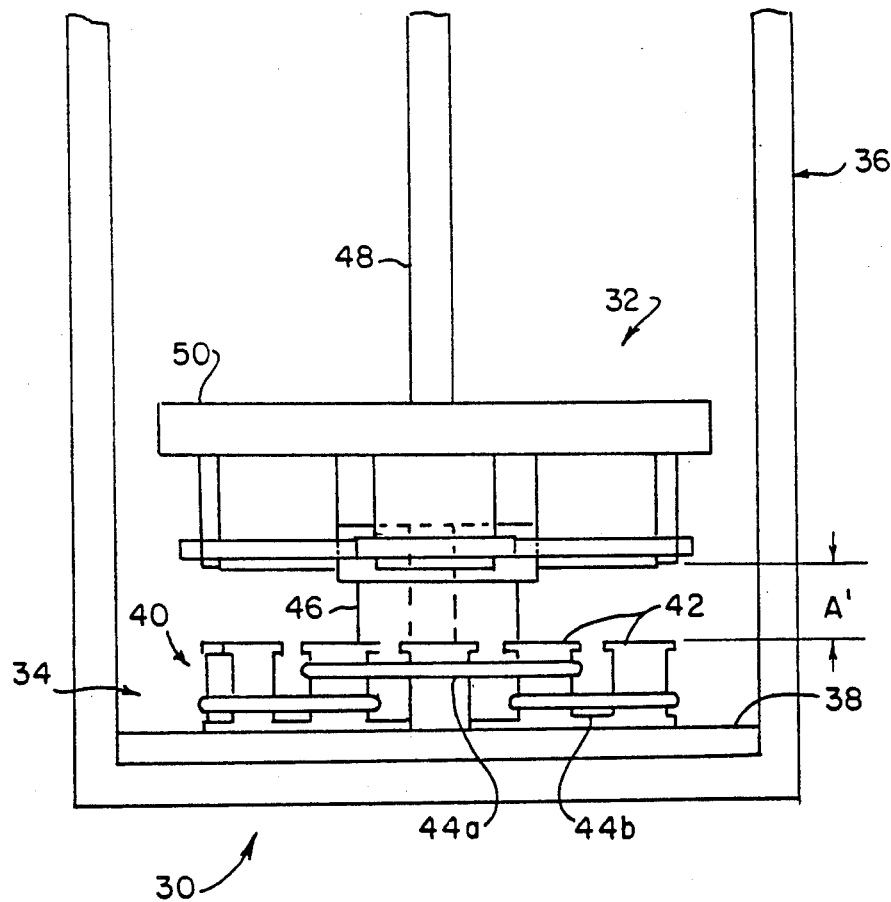
FIG. 6 is an elevational view of an axial gap superconductor motor comprising a second embodiment of the present invention.

Referring to FIGS. 6 and 7, a second embodiment of the present invention comprises an axial gap motor 30 which includes a rotor assembly 32 and a stator assembly 34. The motor is shown installed in a single cryostat 36. However, as described herein, to practice the method of the invention, the rotor and stator assemblies are either kept in separate cryostats, or the single cryostat is filled with a liquid Helium in such a way as to produce the same effect as if the assemblies were in separate cryostats. A cryostat temperature control (not shown) controls the temperature within the cryostat. As seen in FIG. 6, stator assembly 34 comprises a mounting plate 38 of an appropriate material which is sized to fit within the cryostat. A stator 40 comprising a plurality of teeth 42, with associated stator windings 44a, 44b is mounted on the upperside of plate 38, as viewed in the drawings. It will be understood that the number of stator windings can vary. The stator teeth are formed, for example, of a steel material; while, again, the stator windings may be of a conventional electrical conducting material such as copper, or of a HTSC material. Projecting upwardly from the center of plate 38 is a cylindrical support 46 for supporting a shaft 48 of rotor assembly 32.

The rotor assembly comprises a circular mounting plate 50 affixed on shaft 48 so when the end of the shaft is installed in support 46, the rotor assembly is in an axial, spaced relationship with respect to the stator assembly. As seen in FIG. 6, an air gap A' is thus created between the two assemblies. Depending from the underside of plate 50 are a plurality (8) of posts 52 which are of a metallic material, preferably steel. The posts are equidistantly spaced about the circumference of plate 50, the spacing between the posts being a function of the number of poles mounted on plate 50. The posts are positioned so they are aligned with the stator.

The height of the posts is equal. Fitted adjacent the distal end of each post is a ring 54 of HTSC material. Alternatively, the ring is not of an HTSC material; but rather, a disk 56 of HTSC material is attached to the free end of the post. In either event, the purpose of the ring or disk is to trap magnetic fields.

Figure 9:
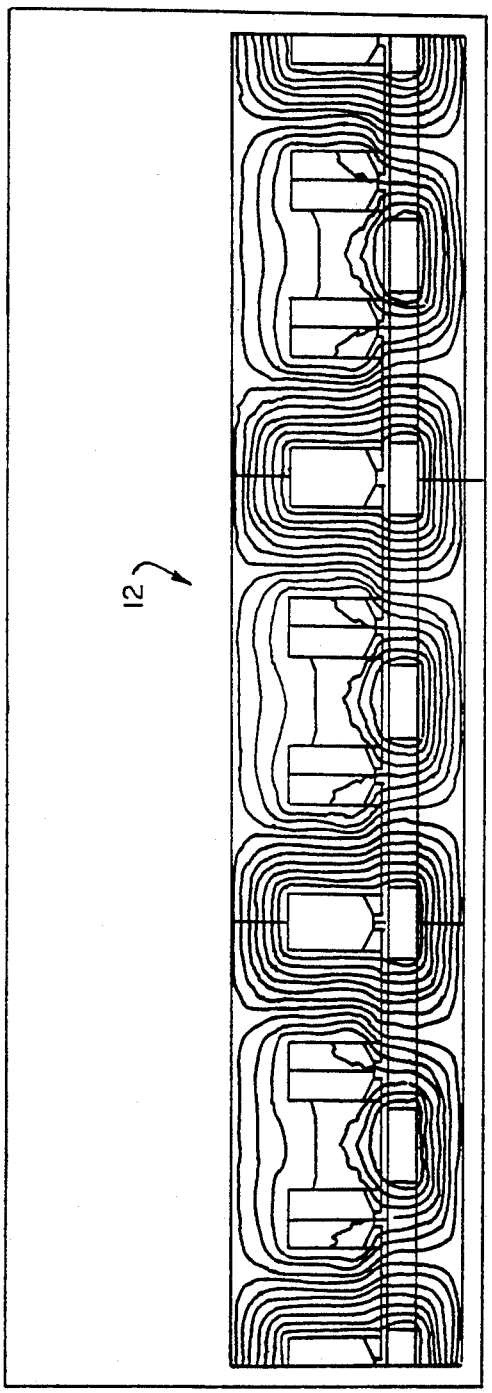
FIG. 9 is a view similar to FIG. 8 illustrating the lines of flux trapped in the rotor when it is cooled below a critical temperature Tc, the stator not being energized; and, FIG. 10 is a graph of temperature vs. time illustrating the operational sequence by which the method of the invention is practiced.
Figure 8:
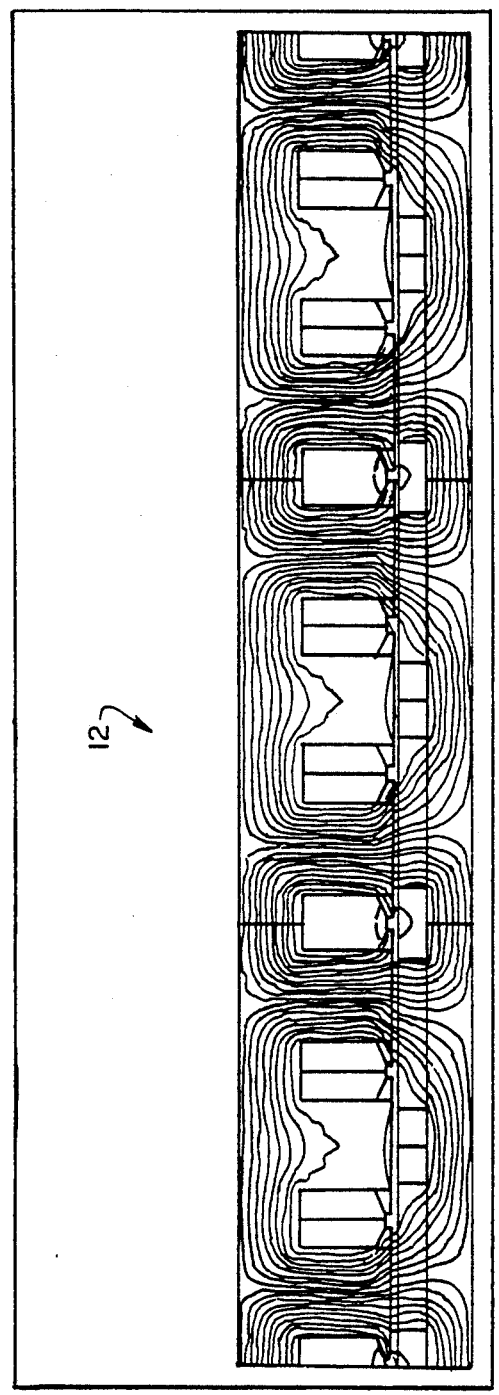
FIG. 8 is an unwrapped side vied of the motor illustrating the lines of Flux when the stator windings are impressing a field on the rotor assembly and the rotor temperature is above the critical temperature.

To further emphasize the effect described above, FIGS. 8 and 9 illustrate unwrapped side views of the rotor assembly shown in FIGS. 6 and 7. FIG. 8 illustrates the condition in which the rotor assembly 12 temperature is above the critical temperature and current flowing through the stator windings impresses a field on the rotor. In FIG. 9, the temperature of rotor assembly is below the critical temperature Tc. The stator windings are not energized. However, because of the flux trapping method described above, flux is trapped in the rotor assembly. This trapped flux produces, for example, a current density of approximately 5,000 amperes/cm$^2$, and a 0.7 Tesla field.

Referring again to FIG. 10, operation of motor 30 is the same as that of motor 10. Thus, if the rotor and stator assemblies of motor 30 are in separate cryostats, the sequence of lowering the temperatures in the respective cryostats is the same as described with respect to motor 10. For a motor 30 with both the rotor and stator assemblies installed in the single cryostat, the same effect is obtained by first filling the cryostat with a liquid cooling medium until the stator assembly is covered. The stator temperature falls below the critical temperature and the stator windings are then energized. At this time, the rotor temperature remains above the critical temperature. Now, more liquid coolant is added to the cryostat until the rotor assembly is also covered. This cause the rotor temperature to fall below the critical level. As a consequence, the stator and rotor assembly temperatures follow the profile shown in FIG. 10, and operation of the motor is as described with respect to motor 10. That is, the stator windings are energized prior to the rotor assembly temperature falling below the critical temperature. Afterwards, the stator windings are de-energized and flux trapping occurs for the rotor to act as a permanent magnet so long as the rotor temperature is maintained below the critical level.

The same In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A superconductor motor comprising:
a stator assembly having at least one stator winding of an electrically conductive material;
a rotor assembly including a plurality of superconductive elements and means for supporting these elements;
means for concentrically mounting the stator and rotor assemblies so there is an axial air gap therebetween;
means for cooling the rotor assembly from a first temperature which is above a critical level to a second temperature which is below the level; and
means for energizing the stator winding while the rotor assembly temperature is being lowered to below the critical level and for de-energizing the winding thereafter, thereby to trap lines of flux in the rotor assembly so the rotor assembly acts like a permanent magnet, the supporting means of the rotor assembly including a plate and a plurality of posts evenly spaced about a side of the plate facing the stator assembly, with the superconductive elements being carried on the posts.

2. The motor of claim 1 wherein the superconductive elements comprise respective rings of superconductive material installed on the respective posts.

3. The motor of claim 1 wherein the superconductive elements comprise respective disks of superconductive elements comprise respective disks of superconductive material, each disk being attached to the distal end of one of the posts.

4. The motor of claim 1 wherein the mounting means includes a shaft extending through the rotor assembly plate.

5. The motor of claim 4 wherein the stator assembly also includes a plate, the stator assembly plate including means for supporting one end of the shaft.

6. The motor of claim 1 wherein the stator plate includes a plurality of stator teeth and the stator assembly comprises two stator windings wound through the teeth.

7. The motor of claim 1 wherein the superconductive elements are of an HTSC material.

8. The motor of claim 1 wherein the stator winding is of an HTSC material.

9. The motor of claim 1 wherein the cooling means comprises a cryostat in which the stator and rotor assemblies are mounted.

10. The motor of claim 9 wherein the stator assembly is installed in the cryostat underneath the rotor assembly and a cooling material is added to the cryostat to lower the temperature of the rotor assembly below the critical temperature.

11. A superconductive motor comprising:
a cryostat;
a stator assembly and a rotor assembly installable in the cryostat;
the stator assembly and rotor assembly being axially spaced from each other when installed therein so there is an axial air gap therebetween, the stator assembly including a stator winding formed of an electrically conductive material, the rotor assembly including a plurality of spaced posts facing the stator assembly, and the rotor assembly including a plurality of superconductive elements one of which is mounted on each of the respective posts, the cryostat being fillable with a cooling medium by which the temperature of the rotor assembly is lowered from above to below a critical temperature, the stator winding being energized while the rotor assembly is above the critical temperature, and maintained energized while the temperature is lowered therebelow, thereby to trap lines of flux in the rotor assembly.

12. The motor of claim 11 wherein the superconductive elements comprise rings of superconductive material respectively installed on the posts.

13. The motor of claim 11 wherein the superconductive elements comprise disks of superconductive material attached the outer ends of the respective posts.

* * * * *

UNITED STATES PATENT AND TRADEMARK OFFICE
CERTIFICATE OF CORRECTION

PATENT NO. :   5,177,054
DATED      :   Jan. 5, 1993
INVENTOR(S):   Jerry D. Lloyd and Alan D. Crapo It is certified that error appears in the above-identified patent and that said Letters Patent is hereby corrected as shown below:

In the claims: (claim 3)

Column 6, lines 15 and 16 are identical; both say, "elements comprise respective disks of superconductive"

delete line 16 entirely --

Claim 3 should read as follows:

3. The motor of claim 1 wherein the superconductive elements comprise respective disks of superconductive material, each disk being attached to the distal end of one of the posts.

Signed and Sealed this

Third Day of May, 1994

Attest:

BRUCE LEHMAN

Attesting Officer        Commissioner of Patents and Trademarks